US008804531B2

(12) United States Patent
Kapadia et al.

(10) Patent No.: US 8,804,531 B2
(45) Date of Patent: Aug. 12, 2014

(54) METHODS AND APPARATUS FOR LOAD BALANCING ACROSS MEMBER PORTS FOR TRAFFIC EGRESSING OUT OF A PORT CHANNEL

(75) Inventors: Shyam Kapadia, Santa Clara, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 13/476,114

(22) Filed: May 21, 2012

(65) Prior Publication Data

US 2013/0308455 A1 Nov. 21, 2013

(51) Int. Cl.
*H04L 12/26* (2006.01)
(52) U.S. Cl.
USPC .......... 370/237; 370/230; 370/235; 370/252; 370/468
(58) Field of Classification Search
None
See application file for complete search history.

(56) References Cited

U.S. PATENT DOCUMENTS

| 6,473,424 | B1 * | 10/2002 | DeJager et al. ............... 370/389 |
| 6,512,742 | B1 * | 1/2003 | Alexander et al. ............ 370/231 |
| 6,910,149 | B2 * | 6/2005 | Perloff et al. ................. 714/4.3 |
| 6,952,401 | B1 * | 10/2005 | Kadambi et al. .............. 370/232 |
| 7,623,455 | B2 * | 11/2009 | Hilla et al. ..................... 370/232 |
| 7,756,029 | B2 * | 7/2010 | Licardie et al. ............. 370/230.1 |
| 2011/0051602 | A1 * | 3/2011 | Matthews et al. ............. 370/235 |
| 2011/0110382 | A1 | 5/2011 | Jabr et al. |

* cited by examiner

*Primary Examiner* — Donald Mills
(74) *Attorney, Agent, or Firm* — Meunier Carlin & Curfman, LLC

(57) ABSTRACT

Methods and apparatus for load balancing across member ports for traffic egressing out of a port channel are provided herein. An example method according to one implementation may include: assigning a quantized value based on current load to each of the network ports in the port channel; receiving a data packet addressed to egress through the port channel; identifying a traffic flow with which the received data packet is associated; determining whether the identified traffic flow is a new traffic flow; and selecting one of the network ports in the port channel as an egress port. Selection of the egress port may be weighted according to the quantized value of each of the network ports in the port channel.

20 Claims, 3 Drawing Sheets

200

| Flow ID | Flow Age | Port ID |
|---------|----------|---------|
| $F_1$ | $A_1$ | $P_1$ |
| $F_2$ | $A_2$ | $P_2$ |
| $F_3$ | $A_3$ | $P_3$ |
| ⋮ | ⋮ | ⋮ |
| $F_n$ | $A_n$ | $P_n$ |

*FIG. 2*

METHODS AND APPARATUS FOR LOAD BALANCING ACROSS MEMBER PORTS FOR TRAFFIC EGRESSING OUT OF A PORT CHANNEL

BACKGROUND

A port channel (or ether channel, link aggregation group, load-balancing group, etc.) is a single logical interface/connection that is created by combining multiple network ports in order to provide higher throughput (i.e., bandwidth) as compared to each of the network ports alone. In addition to providing higher throughput, a port channel also provides redundancy in the case of failure of individual network ports. A port channel is commonly deployed in network devices such as switches, routers, hubs, gateways, etc. in different environments including campus networks, data center networks, enterprise networks, as well as service provider networks.

One challenging problem when using a port channel is how to effectively load balance the traffic flow through the network ports in the port channel. In addition, care must be taken so that data packets associated with a given traffic flow egress from the network device along the same path in order to avoid packet out-of-sequence issues. Traffic flows are defined by unique combinations of fields included in the data packet headers including, but not limited to, the source and destination MAC addresses, the source and destination IP addresses, the source and destination ports and the protocol. In conventional load-balancing schemes, a hash value is calculated for each data packet. The inputs to the hash function can include any combination of user-configured fields such that different hash values correlate with different traffic flows. A modulo operation can be performed on the calculated hash value with the number of network ports in the port channel in order to yield the egress network port. For example, for an n-bit hash, such as a 5-bit hash, there are 32 (i.e., $2^n$) different hash values, which can be evenly divided among the network ports in the port channel. Data packets that hash to a particular hash value are forwarded through a particular network port. Because data packets associated with the same traffic flow hash to the same value, data packets associated with the same traffic flow egress through the same network port.

However, when using traditional load-balancing schemes, the network port selection logic is agnostic to the load on each of the network ports in the port channel. Therefore, if two or more elephant traffic flows egressing out of the port channel happen to hash to the same hash value, then both of the two or more elephant traffic flows will be forwarded over the same network port. As a result, the two or more elephant traffic flows will burden the same network port while the other network ports in the port channel are relatively underutilized.

SUMMARY

Methods and apparatus for load balancing across member ports for traffic egressing out of a port channel are provided herein. An example method according to one implementation may include: assigning a quantized value based on current load to each of the network ports in the port channel; receiving a data packet addressed to egress through the port channel; identifying a traffic flow with which the received data packet is associated; determining whether the identified traffic flow is a new traffic flow; and selecting one of the network ports in the port channel as an egress port. Selection of the egress port may be weighted according to the quantized value of each of the network ports in the port channel.

In addition, the method may include: calculating an n-bit hash value for the received data packet; dividing a plurality of possible n-bit hash values among the network ports in the port channel; and selecting one of the network ports in the port channel as an egress port by selecting a network port in the port channel associated with the calculated n-bit hash value. For example, a network port in the port channel having a greater quantized value may be associated with a greater number of the possible n-bit hash values than a network port in the port channel having a lesser quantized value. Accordingly, the probability of selecting the network port in the port channel having the greater quantized value as the egress port may be greater than the probability of selecting the network port in the port channel having the lesser quantized value as the egress port.

In some implementations, the current load of each of the network ports in the port channel may be defined by an exponential weighted moving average of data packets egressing from each of the network ports in the port channel. Additionally, the current load of each of the network ports in the port channel may be normalized based on a network port speed of each of the network ports in the port channel.

In another implementation, the method may include: maintaining a flow table including a plurality of entries; and determining whether the identified traffic flow is a new traffic flow by determining whether the flow table includes an entry corresponding to the identified traffic flow. Each of the entries may include a traffic flow identifier and a corresponding egress port. In addition, the method may include selecting one of the network ports in the port channel as an egress port using the flow table.

Optionally, the traffic flow identifier may be at least one of a source MAC address, a destination MAC address, a source IP address, a destination IP address, a source port, a destination port, and a protocol identifier.

Alternatively, the traffic flow identifier may be a hash value of at least one of a source MAC address, a destination MAC address, a source IP address, a destination IP address, a source port, a destination port, and a protocol identifier.

It should be appreciated that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 2 illustrates an example flow table according to implementations discussed herein.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for improving load balancing across member ports for traffic egressing out of a port channel in a network device having a modular architecture with a centralized forwarding engine, it will become evident to those skilled in the art that the implementations are not limited thereto, but are applicable for improving load balancing across member ports for traffic egressing out of a port channel in a network device having a modular architecture with other configurations.

Figure 1A:
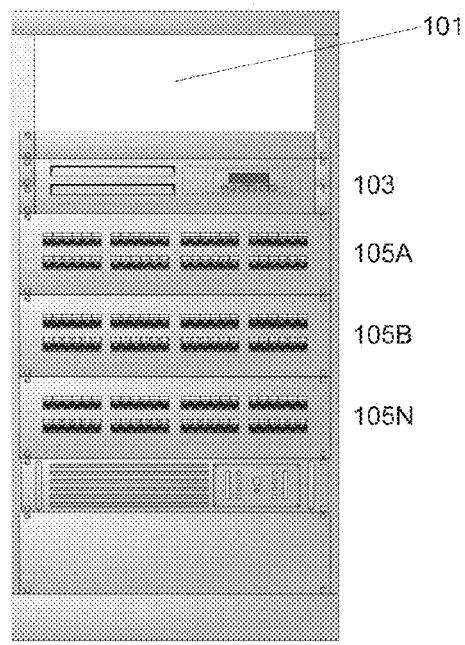
FIG. 1A illustrates an example network device according to implementations discussed herein.

Referring now to FIG. 1A, an example network device is shown. For example, the network device can be a network device having a modular architecture with a centralized forwarding engine. The network device can be a switch, router, hub, gateway, etc., and can be configured to forward (i.e., switch, route, etc.) data packets and/or frames between network nodes, such as a client device and a server device. For example, the network device can include a chassis 101, a forwarding engine 103 and a plurality of line cards 105A, 105B, 105N. Optionally, the line cards 105A, 105B, 105N can be "dumb" line cards. The line cards 105A, 105B, 105N can each include a plurality of network ports (i.e., the interfaces into which the physical links are connected), and the forwarding engine 103 may be configured to implement all of the forwarding decisions, participating in routing protocols, etc. Upon ingress of a data packet into one of the network ports, the data packet is forwarded to the forwarding engine 103, and the forwarding engine 103 then implements the forwarding decisions (i.e., performs the L2 and/or L3 table lookup, for example). It should be understood that the network device shown in FIG. 1A can include more or less components than are shown in FIG. 1A such as, for example, an additional forwarding engine (for redundancy) and/or additional line cards. It should also be understood that the network device can be a network device where some of the processing is offloaded from the forwarding engine to distributed forwarding engines such as the line cards, for example. In the case that processing is offloaded to distributed forwarding engines, statistics from each distributed forwarding engine can be exported to the other distributed forwarding engines. This allows each distributed forwarding engine to make forwarding decisions (i.e., select a network port in the port channel) based on global statistics. The ability to export statistics among the distributed forwarding engines can be accomplished with additional hardware support. For example, if the distributed forwarding engines are line cards, the ASIC of each line card can be configured to export statistics.

As discussed above, a plurality of network ports can be grouped into a single logical interface/connection, which is referred to as a port channel. The forwarding engine 103 can be configured to maintain input and output statistics such as input and output byte and packet counts, for example, for the network ports in the port channel. Input and output byte and packet counts are commonly maintained by an ASIC of the forwarding engine 103, for example, and in some implementations, the input and output byte and packet counts are raw byte and packet counts. The input and output statistics can be representative of the load on each of the network ports in the port channel. The input and output statistics can be used when selecting an egress network port. For example, instead of selecting an egress network port based solely on a calculated hash value of the received data packet and the number of network ports in the port channel, information regarding the load on each of the network ports in the port channel can be accounted for when selecting the egress network port. Thus, a network port having a lower load can have a higher probability of selection as the egress network port for each new traffic flow.

The input and output statistics can be utilized to measure the current load on each of the network ports in the port channel. For example, a normalized exponential weighted moving average of the number of bytes egressing from each of the network ports in the port channel can provide a metric for measuring the current load on each of the network ports in the port channel. The weighting factors can decrease exponentially with time, for example, in order to reduce the influence of progressively older data on the weighted average. In addition, the period of time over which the exponential weighted moving average is calculated can be variable. In some implementations, the weighted moving average may be calculated over a period of day(s). While in other implementations, the weighted moving average may be calculated over a period of hour(s) or minute(s). The period of time may, for example, depend on the type of network and/or the volume of network traffic. The period of time and weighting factors can be selected to reduce the influence of relatively older data on the exponential moving average. Optionally, the exponential weighted moving average can be normalized, where the normalization factor is a function of the physical link speed (i.e., 1G, 10G, 40G, etc.) of each of the network ports in the port channel, for example. By normalizing the exponential weighted moving average, it is possible to compare the relative load of the network ports in the port channel having different performance characteristics.

In addition, after obtaining the normalized exponential moving average, the forwarding engine 103 can be configured to determine a quantized representation of the current load on each of the network ports in the port channel. The quantized representation of the current load can be an N-bit quantized representation of the current load, for example. The quantized representation of the current load for each of the network ports in the port channel can be maintained in order to minimize the amount of state information to be stored. For example, the quantized representation of the current load can be a 4-bit quantized value. Instead of storing the normalized exponential moving average as a raw number for each of the network ports (i.e., 1G, 10G, 40G, etc. network ports) in the port channel, the normalized exponential moving average can be quantized into one of sixteen different current load levels (i.e., 0-15). For example, a network port in the port channel having lower current load can be assigned a higher quantized value (i.e., a larger magnitude) than a network port in the port channel having higher current load. Thus, the quantized representation of the current load (i.e., a 4-bit value) occupies substantially less memory than the raw normalized exponential moving average (i.e., a 10-, 20-, or 30-bit value in some instances). It should be understood that there are many other ways for providing a metric for measuring the current load on each of the network ports in the port channel, and that the normalized exponential moving average of the bytes egressing from each of the network ports in the port channel is only an example. In addition, it should be understood that the N-bit quantized representation of the current load is not limited to a 4-bit quantized representation and that N can be any integer.

Referring now to FIG. 2, an example flow table 200 is shown. The flow table 200 can be maintained by the forwarding engine 103, for example, and can contain information regarding the traffic flows egressing from the port channel. The flow table 200 can include a plurality of entries, each entry being uniquely associated with a traffic flow. As discussed above, traffic flows are defined by unique combinations of fields included in the data packet headers including, but not limited to, the source and destination MAC addresses, the source and destination IP addresses, the source and destination ports and the protocol. Therefore, each entry in the flow table 200 can include a traffic flow identifier ("Flow ID") $F_1$, $F_2$, $F_3$, $F_n$, a traffic flow age ("Flow Age") $A_1$, $A_2$, $A_3$, $A_n$ and a network port identifier ("Port ID") $P_1$, $P_2$, $P_3$, $P_n$. In order to avoid packet out-of-sequence issues, data packets associated with the same flow preferably egress from the same network port in the port channel.

The traffic flow identifier $F_1$, $F_2$, $F_3$, $F_n$ can identify the traffic flow. For example, a data packet can be associated with a traffic flow based on the fields of the data packet header. In this implementation, the traffic flow identifier $F_1$, $F_2$, $F_3$, $F_n$ is the unique combination of fields of the data packet header such as the source and destination MAC addresses, the source and destination IP addresses, the source and destination ports and the protocol that define the traffic flow. When a new data packet is received, the forwarding engine 103 can be configured to perform a table lookup in the flow table 200 based on the unique combination of fields of the new data packet header to determine if the new data packet is associated with an existing traffic flow.

Alternatively, a data packet can be associated with a traffic flow using a hash-based scheme. In this implementation, the forwarding engine 103 can be configured to apply a hashing function to at least one of the fields of the new data packet header to obtain a hash value. For example, the hashing function can be applied to the entire data packet header, only the source and destination IP address, only the destination IP address and the destination port, or any other combination of fields. The calculated hash value may be uniquely associated with the traffic flow. Therefore, the traffic flow identifier $F_1$, $F_2$, $F_3$, $F_n$ can be the calculated hash value. When a new data packet is received, the forwarding engine 103 can be configured to perform a table lookup in the flow table 200 based on the calculated hash value to determine if the new data packet is associated with an existing traffic flow. It should be understood that when the flow identifier $F_1$, $F_2$, $F_3$, $F_n$ is a hash value (as compared to the unique combination of fields), the flow identifier $F_1$, $F_2$, $F_3$, $F_n$ occupies less memory space.

The flow age $A_1$, $A_2$, $A_3$, $A_n$ can indicate how much time has elapsed since the last data packet associated with the traffic flow was received by the forwarding engine 103. The flow age $A_1$, $A_2$, $A_3$, $A_n$ provides an indication of how recently the traffic flow was active. The forwarding engine 103 can be configured to periodically age the flow age $A_1$, $A_2$, $A_3$, $A_n$ included in each entry of the flow table 200. The forwarding engine 103 can be configured to age the flow age $A_1$, $A_2$, $A_3$, $A_n$ every predetermined period of time that a new data packet is not received, for example. The forwarding engine 103 can be configured to use the flow age $A_1$, $A_2$, $A_3$, $A_n$ to age out entries with a flow age greater than a predetermined age (i.e., a stale entries). For example, the forwarding engine 103 can be configured to age out entries as follows. First, after expiration of a first period of time without receiving a new data packet, the entry can be marked to be aged out. Then, after expiration of a second period of time without receiving a new data packet, the entry marked to be aged out can be deleted from the flow table 200. If, however, a new data packet is received before expiration of the second period of time, the entry marked to be aged out can be reset. By aging out stale entries, it is possible to prevent the size of the flow table 200 from growing beyond a desired size. It should be understood that the predetermined period of time, first period of time, second period of time and predetermined age can be any period of time or age, respectively, and may be related to the type of network and/or volume of network traffic.

The port identifier $P_1$, $P_2$, $P_3$, $P_n$ can identify the egress network port in the port channel for the traffic flows. Initially, the value of the port identifier $P_1$, $P_2$, $P_3$, $P_n$ can be set to an initialization value such as 0, for example, to indicate that a data packet associated with the traffic flow has not yet been received. After a data packet is received, the forwarding engine 103 can be configured to update the port identifier $P_1$, $P_2$, $P_3$, $P_n$ to identify the egress network port for the traffic flow with which the data packet is associated. Because the entries in the flow table 200 associate a traffic flow with a port identifier, it is possible to avoid packet out-of sequence issues by forwarding data packets associated with the same traffic flow through the same network port in the port channel. In the event that a traffic flow is forwarded to a different network port in the port channel, care should be taken to update the corresponding entry in the flow table 200 accordingly.

Figure 1B:
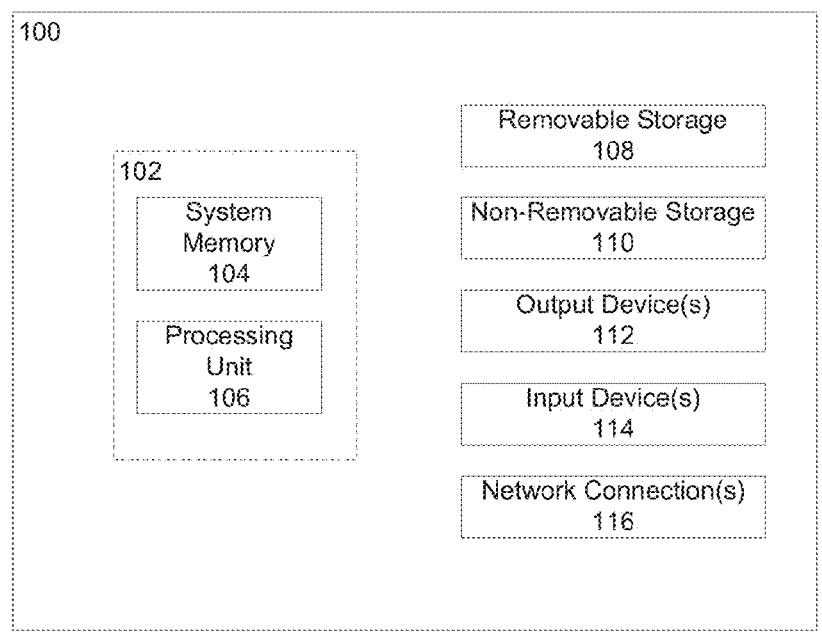
FIG. 1B is a block diagram illustrating an example computing device according to implementations discussed herein.

Referring to FIG. 1B, an example computing device upon which embodiments of the invention may be implemented is illustrated. In particular, the forwarding engine discussed above may be a computing device, such as computing device 100 shown in FIG. 1B. The computing device 100 may include a bus or other communication mechanism for communicating information among various components of the computing device 100. In its most basic configuration, computing device 100 typically includes at least one processing unit 106 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 1B by dashed line 102. The processing unit 106 may be a standard programmable processor that performs arithmetic and logic operations necessary for operation of the computing device 100. Alternatively, the processing unit 106 may be an ASIC that is configured to perform arithmetic and logic operations necessary for operation of the computing device 100.

Computing device 100 may have additional features/functionality. For example, computing device 100 may include additional storage such as removable storage 108 and non-removable storage 110 including, but not limited to, magnetic or optical disks or tapes. Computing device 100 may also contain network connection(s) 116 that allow the device to communicate with other devices. Computing device 100 may also have input device(s) 114 such as a keyboard, mouse, touch screen, etc. Output device(s) 114 such as a display, speakers, printer, etc. may also be included. The additional devices may be connected to the bus in order to facilitate communication of data among the components of the computing device 100. All these devices are well known in the art and need not be discussed at length here.

The processing unit 106 may be configured to execute program code encoded in tangible, computer-readable media. Computer-readable media refers to any media that is capable of providing data that causes the computing device 100 (i.e., a machine) to operate in a particular fashion. Various computer-readable media may be utilized to provide instructions to the processing unit 106 for execution. Common forms of computer-readable media include, for example, magnetic media, optical media, physical media, memory chips or cartridges, a carrier wave, or any other medium from which a computer can read. Example tangible, computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication.

In an example implementation, the processing unit 106 may execute program code stored in the system memory 104. For example, the bus may carry data to the system memory 104, from which the processing unit 106 receives and executes instructions. The data received by the system memory 104 may optionally be stored on the removable storage 108 or the non-removable storage 110 before or after execution by the processing unit 106.

Computing device 100 typically includes a variety of computer-readable media. Computer-readable media can be any available media that can be accessed by device 100 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 104, removable storage 108, and non-removable storage 110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 3:
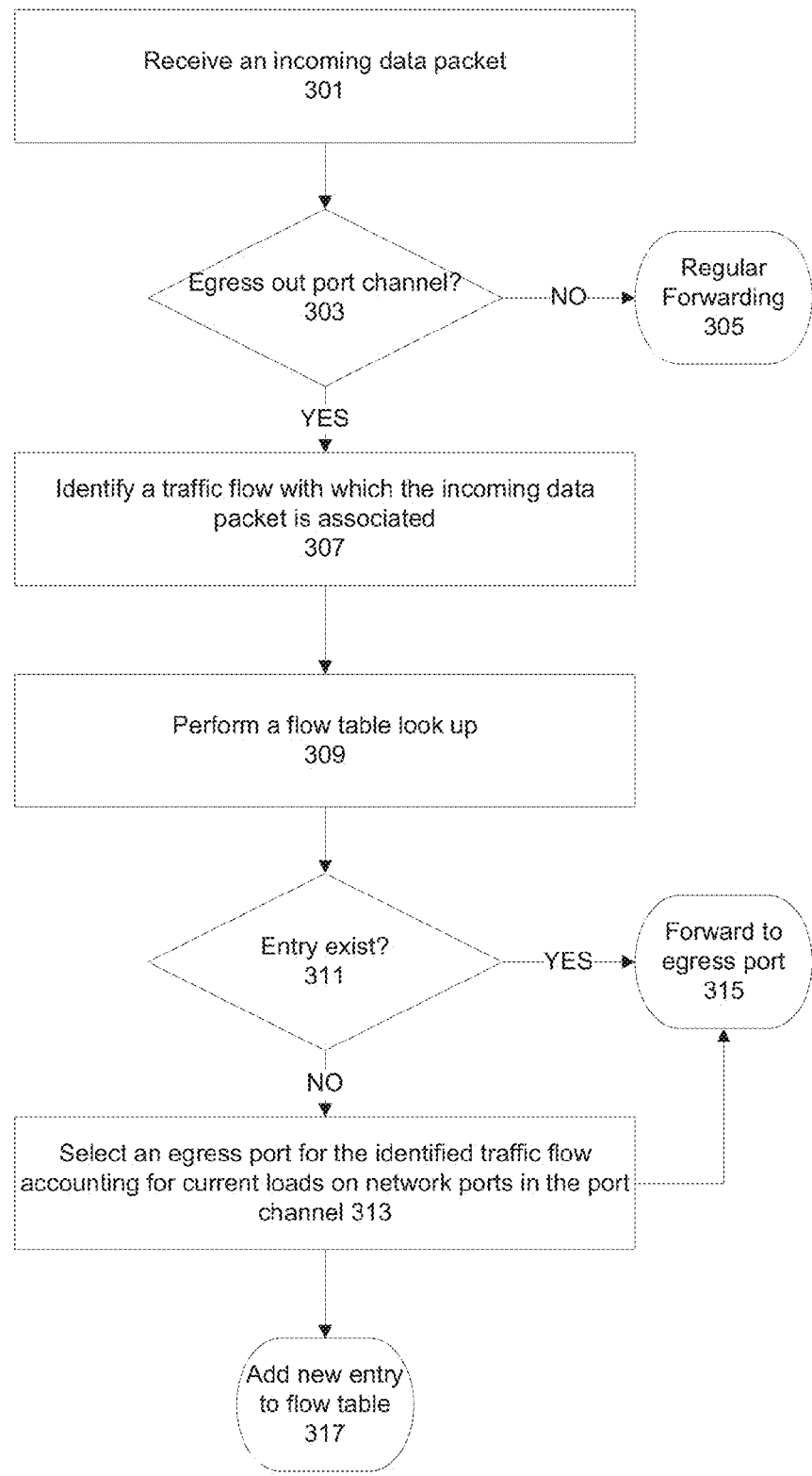
FIG. 3 is a flow diagram illustrating example operations for providing load-balancing.

Referring now to FIG. 3, a flow diagram illustrating example operations for providing load balancing is shown. At 301, a data packet is received by a network device. For example, the data packet can be a data packet flowing over a network between network nodes. The data packet ingresses into the network device through an ingress network port. As discussed above, upon ingress, the data packet can be forwarded to the forwarding engine 103 configured to implement the forwarding decisions (i.e., perform the L2 and/or L3 table lookup, for example). At 303, a determination is made as to whether the received data packet is addressed to egress out of a port channel. If the received data packet is not addressed to egress out of a port channel, the data packet undergoes regular forwarding operations at 305. For example, after a forwarding table look up is performed, the data packet is forwarded to the egress network port.

If the received data packet is addressed to egress out of a port channel, additional operations can be performed to select an egress network port. In some implementations, the forwarding engine 103 can be configured to perform the selection operations discussed below, for example. At 307, a traffic flow with which the received data packet is associated is identified. As discussed above, traffic flows are defined by unique combinations of fields included in the data packet headers including, but not limited to, the source and destination MAC addresses, the source and destination IP addresses, the source and destination ports and the protocol. In some implementations, the traffic flow with which the received data packet is associated can be identified directly from the unique combination of fields of the data packet header. The unique combination of fields of the data packet header, therefore, can serve as the traffic flow identifier. Alternatively, the traffic flow with which the received data is associated can be identified using a hash value. When using a hash value to identify the traffic flow, a hash function is applied to any combination of fields of the data packet header to obtain a hash value. Different traffic flows may be associated with different calculated hash values. The calculated hash value, therefore, can serve as the traffic flow identifier.

At 309, a flow table is consulted to determine if an entry corresponding to the identified traffic flow exists. As discussed above, the flow table can include a plurality of entries, each entry including a traffic flow identifier, a flow age and a port identifier. Optionally, the flow table can be searched based on the traffic flow identifier. At 311, if an entry corresponding to the identified traffic flow exists, the flow table is utilized to select the egress network port through which to forward the received data packet. The egress network port for the traffic flow with which the received data packet is associated can be stored in the flow table as the port identifier. The received data packet can then be forwarded to the egress network port at 315, which is selected using the flow table. Thus, by using the flow table, it is possible to avoid packet out-of-flow issues by forwarding data packets associated with the same traffic flow through the same egress network port.

At 311, if an entry corresponding to the identified traffic flow does not exist (i.e., the identified traffic flow is a new flow), an egress network port can be selected while accounting for the current load on the network ports in the port channel at 313. For example, a probability of selecting each of the network ports in the port channel as the egress network port can be weighted according to the current load of each of the network ports in the port channel. As discussed above, input and output statistics are maintained for each of the network ports in the port channel and can be utilized as a metric of the current load on each of the network ports in the port channel. For example, a normalized exponential moving average of data packets egressing from each of the network ports in the port channel can represent the current load. Optionally, a quantized value can be assigned to each of the network ports in the port channel based on the normalized exponential moving average. The quantized value can represent the current load on each of the network ports in the port channel. Additionally, in some implementations, a network port in the port channel having lower current load can be assigned a higher quantized value (i.e., a larger magnitude) than a network port in the port channel having higher current load. Thus, the probability of selecting the network ports in the port channel as the egress network port can be weighted based on the quantized value.

For example, a hash value can be calculated for the received data packet based on any combination of fields of the data packet header. The hash value can be an n-bit hash value. In addition, a plurality of possible n-bit hash values can be divided among the network ports in the port channel based on the weights assigned to the network ports in the port channel. A network port in the port channel having a greater quantized value can associated with a greater number of the possible n-bit hash values than a network port in the port channel having a lesser quantized value such that the probability of selecting the network port in the port channel having the greater quantized value as the egress network port is greater than the probability of selecting the network port in the port channel having the lesser quantized value as the egress network port.

An example scenario is discussed below to illustrate selecting an egress network port while accounting for the current load on the network ports in the port channel. In this example, the hashing function may generate a 5-bit hash value. Accordingly, there are 32 possible hash values. In addition, in this example, there may be two network ports in the port channel, and the current load for each network port may be represented by a 4-bit quantized value (i.e., the current load can be 15 different quantized values, where greater magnitudes are associated with lower current load and lesser magnitudes are associated with higher current load). The current load on the first network port may be 8, and the current load on the second network port may be 5, for example. In other words, the first network port is assigned a greater magnitude quantized value based on its lower current load as compared to the second network port. The plurality of possible hash values can then be divided among the network ports in the port channel according to Eqn. (1) below.

$$\text{Associated Hash Values} = \text{Total Possible Hash Values} \times \frac{\text{Current Load of a Network Port}}{\text{Current Load of all Network Ports}}, \quad (1)$$

which can be rounded to the nearest integer value.

In this example, the possible hash values can be divided between the network ports in the port channel as shown below in Eqns. (2) and (3) below.

$$\text{First Network Port} = 32 \times \frac{8}{13} = 20 \quad (2)$$

$$\text{Second Network Port} = 32 \times \frac{5}{13} = 12 \quad (3)$$

Thus, if the calculated hash value for the received data packet is between 0 and 19, then the first network port can be selected as the egress network port. On the other hand, if the calculated hash value for the received data packet is between 20 and 31, then the second network port can be selected as the egress network port. Accordingly, because a greater number of the possible n-bit hash values are associated with the network port having the lower current load (i.e., the first network port), the probability of selecting the first network port as the egress network port is greater than the probability of selecting the second network port as the egress network port. In other words, selection of the egress network port is weighted according to the current load on the network ports in the port channel. It should be understood, however, that the scheme for selecting the egress network port discussed above requires that for a generated n-bit hash value, the maximum number of port channel members is less than $2^n$.

Additionally, upon selecting the egress network port for the identified traffic flow, the received packet can be forwarded to the egress network port at 315, and the flow table can be updated at 317. Specifically, the flow table can be updated to include an entry for the identified traffic flow that includes a traffic flow identifier, flow age, and port identifier (i.e., the selected egress network port). Accordingly, the egress network port for subsequently received data packets associated with the same traffic flow can be obtained using the flow table.

Initially, the flow table may be empty, and there may not be an entry corresponding to the identified traffic flow. When the flow table is empty, the current load on each of the network ports in the port channel is equal (i.e., the current load is 0 for the network ports). Accordingly, a load-balancing scheme that does not account for the current load may be utilized to select an egress network port. In this case, the forwarding engine 103 may default to the traditional load-balancing scheme. For example, a hash value can be calculated for the received data packet based on any combination of fields of the data packet header. A modulo operation can be performed on the calculated hash value with the number of network ports in the port channel in order to yield the egress network port. For example, for an n-bit hash, such as a 5-bit hash, there are 32 (i.e., $2^n$) different hash values, which can be evenly divided among the network ports in the port channel. Because the current load is initially equal on all of the network ports in the port channel, the probabilities of selecting any of the network ports in the port channel as the egress network port can be equal. Upon selecting an egress network port, the flow table can be updated. Specifically, the flow table can be updated to include an entry for the identified traffic flow that includes a traffic flow identifier, flow age, and port identifier (i.e., the selected egress network port). Accordingly, the egress network port for subsequently received data packets associated with the same traffic flow can be obtained using the flow table. In addition, the flow age for the traffic flow can be periodically updated to indicate how recently the traffic flow was active.

Optionally, when the flow table is full and it is not possible to add new entries, the egress network port can also be selected without accounting for the current load on the network ports in the port channel. In this case, a load-balancing scheme that does not account for the current load, similarly to the load-balancing scheme discussed above when the flow table is initially empty, may be utilized to select an egress network port. For example, the forwarding engine 103 can be notified that the flow table is full, and if an entry in the flow table does not correspond to the received data packet, an egress network port can be selected by performing a modulo operation on the calculated hash value with the number of network ports (without weighting the network ports based on current load).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing load balancing for a port channel including a plurality of network ports, comprising:
   assigning a quantized value to each of the network ports in the port channel, each quantized value being based on a current load on each of the network ports in the port channel;
   assigning a respective number of n-bit hash values of a plurality of possible n-bit hash values to each of the network ports in the port channel, wherein the respective number of n-bit hash values assigned to each of the network ports in the port channel is weighted according to the quantized value of each of the network ports in the port channel;
   receiving a data packet addressed to egress through the port channel;
   identifying a traffic flow with which the received data packet is associated;
   determining whether the identified traffic flow is a new traffic flow;
   upon determining that the identified traffic flow is a new traffic flow, selecting one of the network ports in the port channel as an egress port, wherein a probability of selecting each of the network ports in the port channel as the egress port is based on the respective number of n-bit hash values assigned to each of the network ports in the port channel.

2. The method of claim 1, further comprising:
   calculating an n-bit hash value for the received data packet; and
   selecting one of the network ports in the port channel as an egress port further comprises selecting a network port in the port channel associated with the calculated n-bit hash value, wherein a network port in the port channel having a greater quantized value being associated with a greater number of the possible n-bit has values than a network port in the port channel having a lesser quantized value such that the probability of selecting the network port in the port channel having the greater quantized values as the egress port is greater than the probability of selecting the network port in the port channel having the lesser quantized value as the egress port.

3. The method of claim 1, wherein the current load of each of the network ports in the port channel is defined by an exponential weighted moving average of data packets egressing from each of the network ports in the port channel.

4. The method of claim 3, wherein the current load of each of the network ports in the port channel is normalized based on a network port speed of each of the network ports in the port channel.

5. The method of claim 1, further comprising:
   maintaining a flow table including a plurality of entries, each of the entries having a traffic flow identifier and a corresponding egress port, the corresponding egress port being one of the network ports in the port channel; and
   determining whether the identified traffic flow is a new traffic flow further comprises determining whether the flow table includes an entry corresponding to the identified traffic flow.

6. The method of claim 5, wherein the traffic flow identifier is at least one of a source MAC address, a destination MAC address, a source IP address, a destination IP address, a source port, a destination port, and a protocol identifier.

7. The method of claim 5, wherein the traffic flow identifier is a hash value of at least one of a source MAC address, a destination MAC address, a source IP address, a destination IP address, a source port, a destination port, and a protocol identifier.

8. The method of claim 5, further comprising upon determining that the identified traffic flow is not a new traffic flow, selecting one of the network ports in the port channel as an egress port using the flow table.

9. A non-transitory computer-readable recording medium having computer-executable instructions stored thereon for providing load balancing for a port channel including a plurality of network ports of a network device that, when executed by the network device, cause the network device to:
   assign a quantized value to each of the network ports in the port channel, each quantized value being based on a current load on each of the network ports in the port channel;
   assign a respective number of n-bit hash values of a plurality of possible n-bit hash values to each of the network ports in the port channel, wherein the respective number of n-bit hash values assigned to each of the network ports in the port channel is weighted according to the quantized value of each of the network ports in the port channel;
   receive a data packet addressed to egress through the port channel;
   identify a traffic flow with which the received data packet is associated;
   determine whether the identified traffic flow is a new traffic flow;
   upon determining that the identified traffic flow is a new traffic flow, select one of the network ports in the port channel as an egress port, wherein a probability of selecting each of the network ports in the port channel as the egress port is based on the respective number of n-bit hash values assigned to each of the network ports in the port channel.

10. The non-transitory computer-readable recording medium of claim 9, having further computer-executable instructions stored thereon that, when executed by the network device, cause the network device to:
    calculate an n-bit hash value for the received data packet; and
    select one of the network ports in the port channel as an egress port further comprises selecting a network port in the port channel associated with the calculated n-bit hash value, wherein a network port in the port channel having a greater quantized value being associated with a greater number of the possible n-bit has values than a network port in the port channel having a lesser quantized value such that the probability of selecting the network port in the port channel having the greater quantized values as the egress port is greater than the probability of selecting the network port in the port channel having the lesser quantized value as the egress port.

11. The non-transitory computer-readable recording medium of claim 9, wherein the current load of each of the network ports in the port channel is defined by an exponential weighted moving average of data packets egressing from each of the network ports in the port channel.

12. The non-transitory computer-readable recording medium of claim 11, wherein the current load of each of the network ports in the port channel is normalized based on a network port speed of each of the network ports in the port channel.

13. The non-transitory computer-readable recording medium of claim 9, having further computer-executable instructions stored thereon that, when executed by the network device, cause the network device to:
    maintain a flow table including a plurality of entries, each of the entries having a traffic flow identifier and a corresponding egress port, the corresponding egress port being one of the network ports in the port channel; and
    determine whether the identified traffic flow is a new traffic flow further comprises determining whether the flow table includes an entry corresponding to the identified traffic flow.

14. The non-transitory computer-readable recording medium of claim 13, wherein the traffic flow identifier is at least one of a source MAC address, a destination MAC address, a source IP address, a destination IP address, a source port, a destination port, and a protocol identifier.

15. The non-transitory computer-readable recording medium of claim 13, wherein the traffic flow identifier is a hash value of at least one of a source MAC address, a destination MAC address, a source IP address, a destination IP address, a source port, a destination port, and a protocol identifier.

16. The non-transitory computer-readable recording medium of claim 13, having further computer-executable instructions stored thereon that, when executed by the network device, cause the network device to, upon determining that the identified traffic flow is not a new traffic flow, select one of the network ports in the port channel as an egress port using the flow table.

17. A network device for providing load balancing for a port channel, comprising:
    a plurality of network ports configured as the port channel;
    a central forwarding engine; and
    a memory communicatively connected to the central forwarding engine having computer-executable instructions stored thereon that, when executed by the central forwarding engine, cause the central forwarding engine to:
    assign a quantized value to each of the network ports in the port channel, each quantized value being based on a current load on each of the network ports in the port channel;
    assign a respective number of n-bit hash values of a plurality of possible n-bit hash values to each of the network ports in the port channel, wherein the respective number of n-bit hash values assigned to each of the network ports in the port channel is weighted according to the quantized value of each of the network ports in the port channel;
    receive a data packet addressed to egress through the port channel;
    identify a traffic flow with which the received data packet is associated;
    determine whether the identified traffic flow is a new traffic flow;
    upon determining that the identified traffic flow is a new traffic flow, select one of the network ports in the port channel as an egress port, wherein a probability of selecting each of the network ports in the port channel as the egress port is based on the respective number of n-bit hash values assigned to each of the network ports in the port channel.

18. The network device of claim 17, wherein the memory includes further computer-executable instructions that, when executed by the central forwarding engine, cause the central forwarding engine to:
    calculate an n-bit hash value for the received data packet; and
    select one of the network ports in the port channel as an egress port further comprises selecting a network port in the port channel associated with the calculated n-bit hash value, wherein a network port in the port channel having a greater quantized value being associated with a greater number of the possible n-bit has values than a network port in the port channel having a lesser quantized value such that the probability of selecting the network port in the port channel having the greater quantized values as the egress port is greater than the probability of selecting the network port in the port channel having the lesser quantized value as the egress port.

19. The network device of claim 17, wherein the current load of each of the network ports in the port channel is defined by an exponential weighted moving average of data packets egressing from each of the network ports in the port channel.

20. The network device of claim 19, wherein the current load of each of the network ports in the port channel is normalized based on a network port speed of each of the network ports in the port channel.

* * * * *